R. WEIDEMANN.
SPOKE TIGHTENING DEVICE.
APPLICATION FILED FEB. 26, 1909.

952,487.

Patented Mar. 22, 1910.

WITNESSES:

INVENTOR
Reinhold Weidemann
BY
Edward V. Hardway
ATTORNEY

UNITED STATES PATENT OFFICE.

REINHOLD WEIDEMANN, OF HOUSTON, TEXAS, ASSIGNOR OF ONE-HALF TO MORRIS GABERT, OF HOUSTON, TEXAS.

SPOKE-TIGHTENING DEVICE.

952,487.   Specification of Letters Patent.   Patented Mar. 22, 1910.

Application filed February 26, 1909. Serial No. 480,170.

*To all whom it may concern:*

Be it known that I, REINHOLD WEIDEMANN, a citizen of the United States, residing at Houston, in the county of Harris and State of Texas, have invented certain new and useful Improvements in Spoke-Tightening Devices, of which the following is a specification.

My invention relates to new and useful improvements in spoke tightening devices and more particularly to that class of such devices as are designed to be used on the spokes of such vehicles as wagons and buggies.

The device is designed to fit on the end of the spoke and forms a part thereof and is provided with means for fastening the spoke to the felly as well as means for lengthening and shortening the spoke.

The object of the invention is to provide a device of the character described whereby the spoke may be lengthened or shortened so as to keep the felly drawn tight against the tire in order to keep the wheel firm and substantial.

Another object resides in the provision of means whereby a broken or injured spoke may be removed and replaced without the necessity of removing the tire and felly or taking the wheel apart.

Finally the object of the invention is to provide a device of the character described that will be strong and durable; one which will be simple and inexpensive to construct and one in which the parts will not be liable to get out of working order.

With the above and other objects in view my invention has particular relation to certain novel features of construction and operation an example of which is described in this specification and illustrated in the accompanying drawings wherein:—

Figure 1:
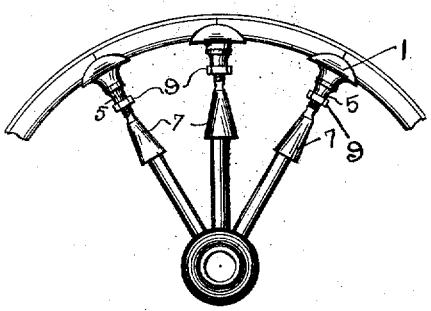
Figure 2:
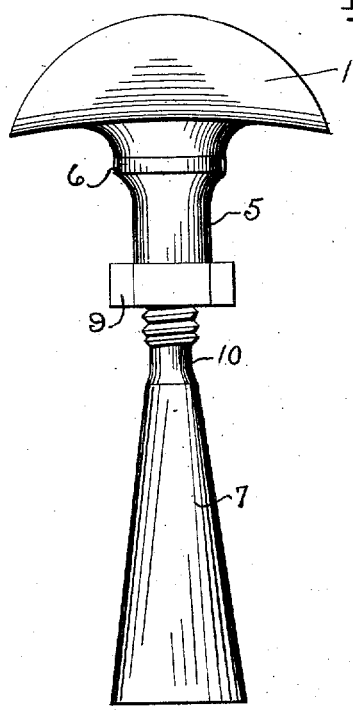
Figure 3:
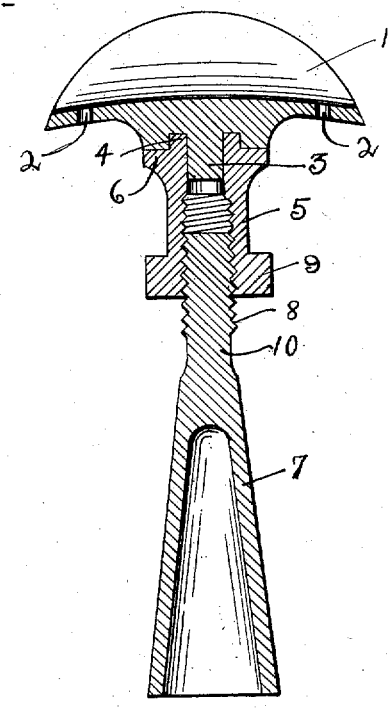

Figure 1, is a side elevation of a section of a wheel showing my device in elevation. Fig. 2, is an enlarged elevational view of the device. Fig. 3, is a transverse vertical sectional view thereof.

Referring now more particularly to the drawings wherein like numerals of reference designate similar parts in each of the figures, the numeral 1 refers to a clamp adapted to embrace the felly, as shown, and provided with apertures 2, for receiving bolts, which are designed to pass through the said apertures and the felly for holding said clamp in its proper position. This clamp is provided with a centrally located, inwardly extending, nipple 3 which is surrounded by a circular groove 4. This nipple is adapted to project into an intermediate sleeve 5 which is provided with a recess for its reception. The sleeve also carries a circular flange upon its outward end which is adapted to fit into the groove 4 and the connection between the clamp 1 and sleeve 5 is thereby strengthened, and the sleeve is also thereby permitted to turn when it is desired to lengthen or shorten the spoke. The sleeve also carries a collar 6 near its outward end which is integral with said sleeve and which is adapted to rest firmly against clamp 1 and thereby further strengthen the said connection.

The numeral 7 refers to a ferrule which is, preferably, conical in shape, and which is adapted to receive the outward end of the spoke proper. This ferrule carries a threaded extension 8 which is adapted to screw into a tapped hole in the inward end of sleeve 5.

The sleeve 5 carries a polygonal head 9 by means of which it may be turned with a wrench. The extension 8 is connected to the ferrule proper by means of a neck 10, smaller in diameter than the main extension, over which the sleeve 5 may pass when the spoke is being shortened and thus greater latitude is given in lengthening and shortening the spoke.

It is believed that from the above description the method of operation of this device will be readily understood without further explanation; but I desire to reserve the right to vary the specific form and construction shown and described so long as the spirit of the invention is not departed from.

What I claim is:—

In a spoke tightening device, a ferrule member, an elongated extension carried thereby, a clamp member, an inwardly extending nipple carried by said clamp member, and having a circular groove therearound, an intermediate connecting member adapted to engage with the elongated extension of said ferrule member and the nipple of said clamp member, a circular flange carried by the outer end of the intermediate connecting member and adapted to project into the groove of the clamp member, and an annular collar surrounding the said flange and adapted to contact with said clamp member and strengthen the union of said members.

In testimony whereof I have signed my name to this specification in the presence of two subscribing witnesses.

REINHOLD WEIDEMANN.

Witnesses:
 WM. A. CATHEY,
 GLYNN DAVIS.